United States Patent [19]
Hayashi et al.

[11] Patent Number: 6,091,550
[45] Date of Patent: Jul. 18, 2000

[54] OPTICAL SYSTEM FOR USE IN AN IMAGE PROJECTOR

[75] Inventors: Kohtaro Hayashi, Toyonaka; Yasumasa Sawai, Yamatotakada; Shunta Takimoto, Nishinomiya; Kenji Konno, Sakai, all of Japan

[73] Assignee: Minolta, Co., Ltd., Osaka, Japan

[21] Appl. No.: 09/259,175

[22] Filed: Feb. 26, 1999

[30] Foreign Application Priority Data

Feb. 27, 1998 [JP] Japan .................................. 10-046648

[51] Int. Cl.[7] .............................. G02B 3/00; G02B 27/14; G02B 15/14; F21V 21/26
[52] U.S. Cl. .......................... 359/649; 359/629; 359/691; 362/268
[58] Field of Search ..................................... 359/629, 649, 359/650, 651, 691; 362/268

[56] References Cited

U.S. PATENT DOCUMENTS

| | | | |
|---|---|---|---|
| 5,404,175 | 4/1995 | Nagae | 348/751 |
| 5,552,938 | 9/1996 | Sugawara | 356/691 |

FOREIGN PATENT DOCUMENTS 5-203872  8/1993  Japan .

*Primary Examiner*—Georgia Epps
*Assistant Examiner*—Saud Seyrafi
*Attorney, Agent, or Firm*—Sidley & Austin

[57] ABSTRACT

A projector optical system has a reflection-type display panel, an illumination optical system for illuminating the reflection-type display panel, a projection optical system for projecting the images displayed on the reflection-type display panel onto a projected surface, and a light-deriving means for directing illumination light toward the reflection-type display panel. The projection optical system has, from the projected-surface side, a front lens unit and a rear lens unit. The light-deriving means is disposed between the front and rear lens units. Additionally, the following condition is fulfilled:

$$-1.5 < \phi F / \phi < -0.1$$

where $\phi F$ represents the optical power of the front lens unit of the projection optical system, and $\phi$ represents the optical power of the entire projection optical system.

22 Claims, 6 Drawing Sheets

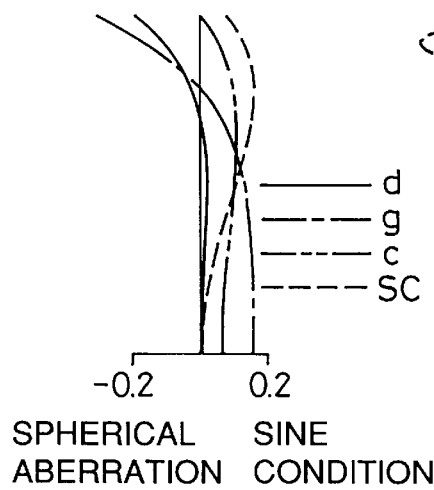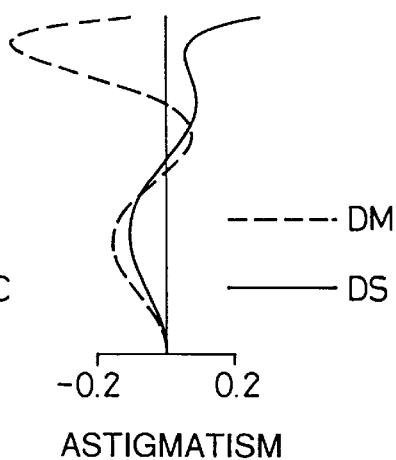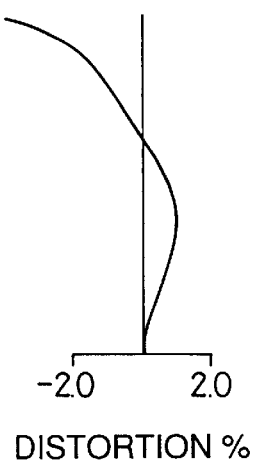

EFFECTIVE FNO=2.50

- d
- - - g
- - - c
- - - - SC

SPHERICAL ABERRATION / SINE CONDITION

Y'=20.9

- - - - DM
——— DS

ASTIGMATISM

Y'=20.9

DISTORTION %

OPTICAL SYSTEM FOR USE IN AN IMAGE PROJECTOR

This application is based on application No. H10-046648 filed in Japan, the content of which is hereby incorporated by reference.

BACKGROUND OF THE INVENTION

1. Field of the Invention

The present invention relates to an optical system for use in an image projector (hereafter such an optical system will be referred to as a "projector optical system"), and more particularly to a projector optical system for use in an image projection apparatus (such as a liquid crystal projector) for projecting an image from a reflection-type display panel (such as a reflection-type liquid crystal panel) onto a screen.

2. Description of the Prior Art

As a method for achieving appropriate illumination in a projector optical system of the type that projects the image displayed on a reflection-type display panel onto a screen, U.S. Pat. No. 5,552,938 and Japanese Laid-Open Patent Application No. H5-203872 propose directing the light for illumination to the reflection-type display panel by the use of a polarized-light separating prism disposed in the position of the aperture stop of the projector optical system. FIG. 7 shows the outline of the structure of such a projector optical system. This projector optical system is provided with a projection optical system and an illumination optical system. The projection optical system is composed of a front lens unit (GrF), a polarized-light separating prism (Pr2), an aperture stop (A), and a rear lens unit (GrR). The illumination optical system is composed of a condenser lens (CL).

The light beam from a light source (1) is formed into a substantially parallel beam by a reflector (2), and is then condensed by the condenser lens (CL) so as to form an image of the light source. The light source (1), the reflector (2), the condenser lens (CL), and the polarized-light separating prism (Pr2) are so arranged that the image of the light source is formed in the position of the aperture stop (A). Thus, this structure conforms to that of the so-called Koehler illumination. Of the light beam that is condensed to form the image of the light source, only the S-polarized light component is reflected by the polarized-light separating prism (Pr2). The light beam reflected from the polarized-light separating prism (Pr2) then passes through the rear lens unit (GrR), and then enters a color separating/integrating prism (Pr1), where the light beam is separated into three light beams of different colors so as to illuminate the display surfaces of three reflection-type display panels (PR, PG, and PB) individually, with each light beam illuminating the entire display surface of the corresponding display panel.

Since these display panels (PR, PG, and PB) employ reflection-type liquid crystal panels, the light beam that illuminates each of the display panels (PR, PG, and PB) is, when reflected therefrom, partially P-polarized and partially S-polarized according to the pattern formed by the pixels of the display panel. The light beams reflected from the individual display panels are then, by the color separating/integrating prism (Pr1), integrated into a single light beam to be projected (hereafter referred to as the "projection light beam"), which then passes through the rear lens unit (GrR). Thereafter, of this projection light beam, only the P-polarized light component is allowed to pass through the polarized-light separating prism (Pr2). Here, note that the front lens unit (GrF) is designed to be substantially afocal so that the rays from around the center of each of the display panels (PR, PG, and PB) pass through the polarized-light separating prism (Pr2) as a nearly parallel beam. After passing through the polarized-light separating prism (Pr2), the projection light beam passes through the front lens unit (GrF), and then forms a display image on a screen (S).

In a case where a projector optical system of the type that projects the image displayed on a reflection-type display panel onto a screen is employed in a projection television system of a backward-projection type (rear type), a wide angle of view needs to be achieved in the projection optical system provided in the projector optical system. In the above-described conventional example, in order to achieve a wide angle of view in its projection optical system, it is essential to increase the angular magnification offered by its front lens unit (GrF). However, if the angular magnification is increased, the front lens unit (GrF) will have an unduly large diameter. This is because the front lens unit (GrF) is designed to be afocal, i.e. to have almost zero optical power.

Moreover, in a case where a high-efficiency light source such as a metal halide lamp is employed in order to secure sufficiently bright illumination in the projector optical system, an integrator is additionally required therein to prevent uneven illumination that such a light source tends to cause. In the projector optical system, like the above-described conventional example, that is so designed that the light source image is formed in the vicinity of the aperture stop (A) of its projection optical system, the use of an integrator necessitates the use of an illumination relay optical system to allow the light source image formed within the integrator to be re-focused in the vicinity of the aperture stop (A) of the projection optical system. In this case, however, since the front lens unit (GrF) of the projection optical system is designed to be afocal, the illumination relay optical system needs to be designed as a telecentric optical system. To be telecentric, however, the illumination relay optical system needs to be unduly large.

SUMMARY OF THE INVENTION

An object of the present invention is to provide a projector optical system that offers a wide angle of view in its projection optical system and allows the use of a high-efficiency light source, despite having compact projection and illumination optical systems.

To achieve the above object, according to one aspect of the present invention, a projector optical system is provided with a reflection-type display panel, an illumination optical system for illuminating the reflection-type display panel, a projection optical system for projecting the images displayed on the reflection-type display panel onto a projected surface, and a light-deriving means for directing illumination light toward the reflection-type display panel. The projection optical system is composed of, from the projected-surface side, a front lens unit and a rear lens unit. The light-deriving means is disposed between the front and rear lens units. Additionally, the following condition is fulfilled:

$$-1.5 < \phi F/\phi < -0.1$$

where $\phi F$ represents the optical power of the front lens unit of the projection optical system; and $\phi$ represents the optical power of the entire projection optical system.

According to another aspect of the present invention, a projector optical system that projects the images displayed on the reflection-type display panel onto a projected surface is provided with, from the projected-surface side, a front lens unit, a light-deriving means for directing illumination light supplied from an external light source toward the reflection-type display panel, and a rear lens unit. Additionally, the following condition is fulfilled:

$$-1.5<\phi F/\phi<-0.1$$

where $\phi F$ represents the optical power of the front lens unit of the projection optical system; and $\phi$ represents the optical power of the entire projection optical system.

According to still another aspect of the present invention, a projector optical system is provided with three reflection-type display panels corresponding to three primary color images, a color separating/integrating prism, an illumination optical system for illuminating the reflection-type display panels via the color separating/integrating prism, a projection optical system for projecting the images displayed on the reflection-type display panels, through the color separating/integrating prism, onto a projected surface, and a light-deriving means for directing illumination light toward the reflection-type display panels. The projection optical system is composed of, from the projected-surface side, a front lens unit and a rear lens unit. The light-deriving means is disposed between the front and rear lens units. Additionally, the following condition is fulfilled:

$$-1.5<\phi F/\phi<-0.1$$

where $\phi F$ represents the optical power of the front lens unit of the projection optical system; and $\phi$ represents the optical power of the entire projection optical system.

BRIEF DESCRIPTION OF THE DRAWINGS

This and other objects and features of this invention will become clear from the following description, taken in conjunction with the preferred embodiments with reference to the accompanied drawings in which:

FIGS. 4A to 4C are graphic representations of the aberrations observed in the projection optical system of Example 2;

DESCRIPTION OF THE PREFERRED EMBODIMENTS

Hereinafter, projector optical systems embodying the present invention will be described with reference to the accompanying drawings. Note that, in the following descriptions, the components that play the same or corresponding roles in different embodiments will be identified with the same reference symbols, and overlapping descriptions will be omitted.

Figure 1:
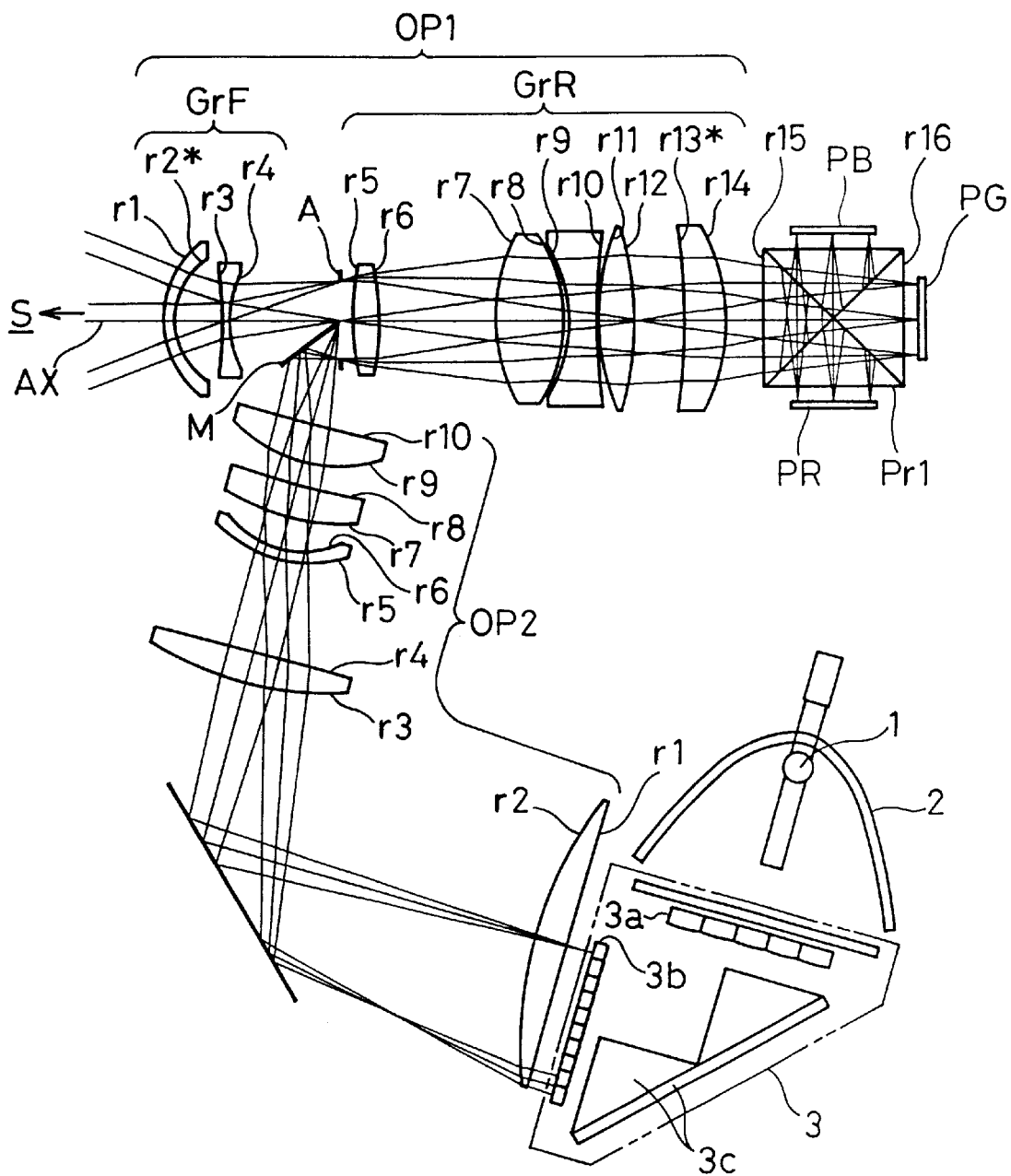
FIG. 1 is an optical arrangement diagram of the projector optical system of a first embodiment (Example 1) of the present invention.
Figure 3:
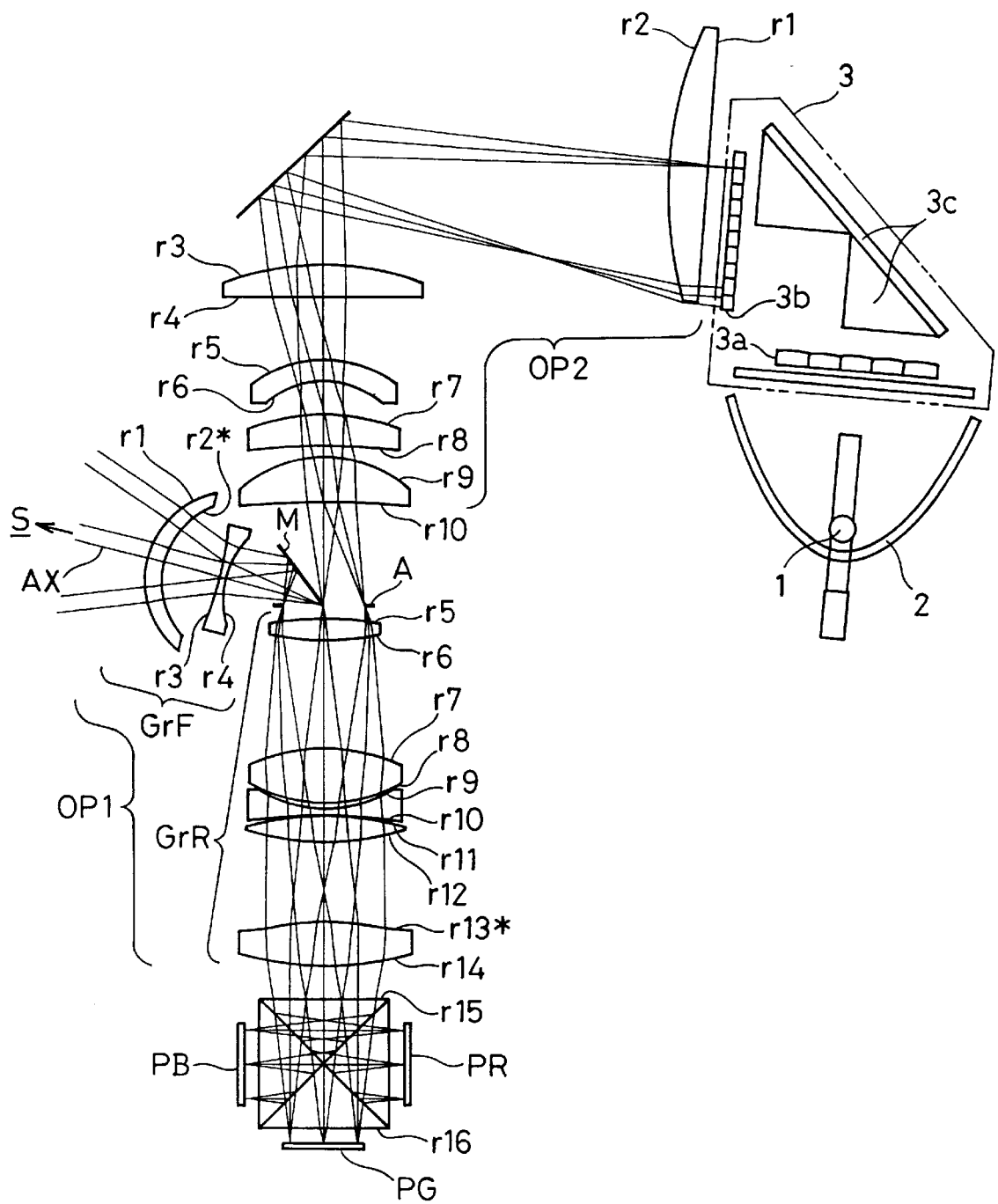
FIG. 3 is an optical arrangement diagram of the projector optical system of a second embodiment (Example 2) of the present invention.
Figure 5:
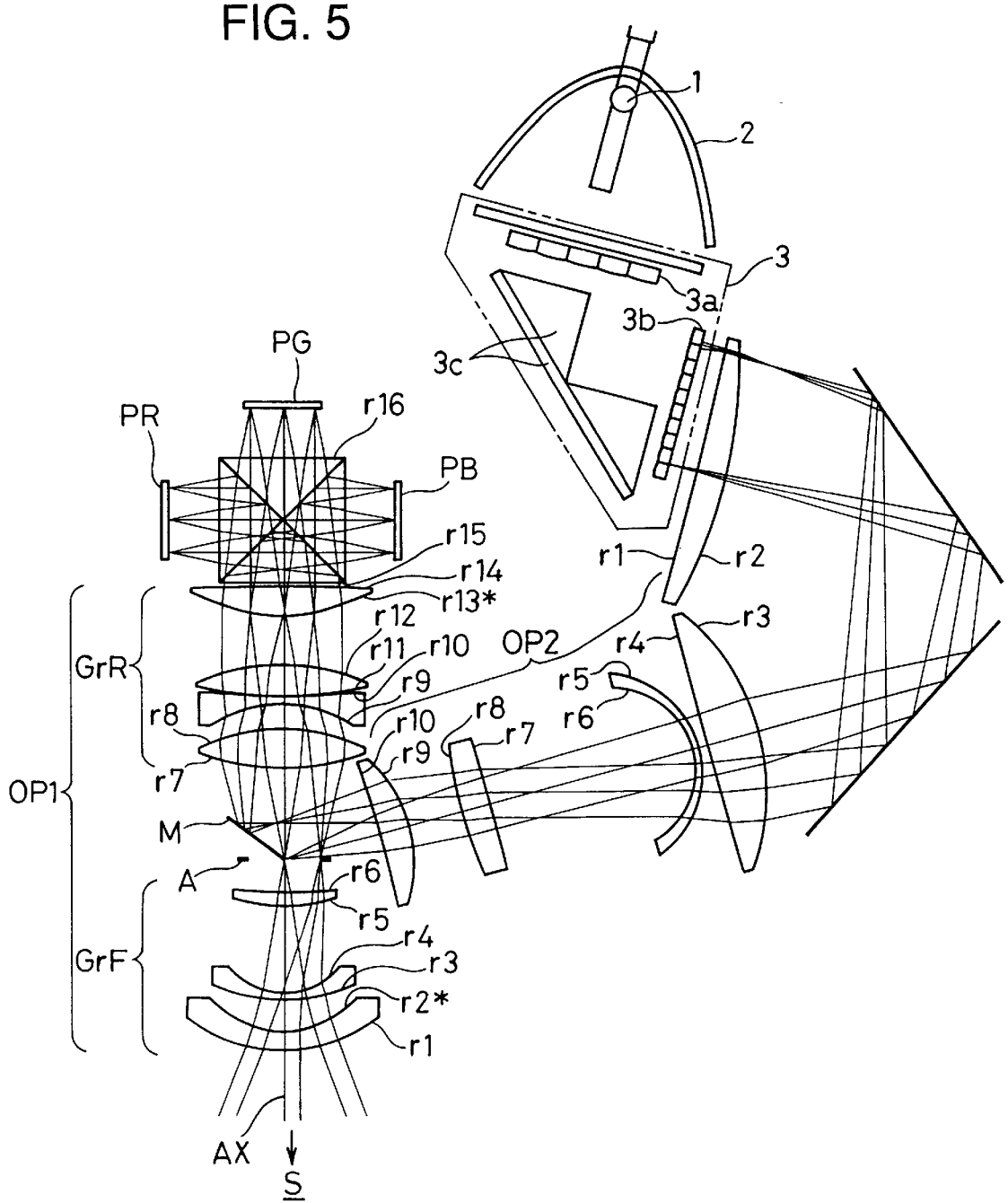
FIG. 5 is an optical arrangement diagram of the projector optical system of a third embodiment (Example 3) of the present invention.

FIGS. 1, 3, and 5 are optical arrangement diagrams of the projector optical systems of a first, a second, and a third embodiment, respectively, of the present invention. These projector optical systems of the first to third embodiments are each designed for use in an image projection apparatus of a rear type. The projection optical system (OP1) provided in each of these projector optical systems is built as a fixed-focal-length lens system. In the projection optical system (OP1) of the projector optical system of each embodiment, a surface marked with ri (i=1, 2, 3, . . . ) is the ith surface counted from the enlargement side (i.e. the screen (S) side), a surface ri marked with an asterisk (*) is an aspherical surface. Furthermore, in the illumination relay optical system (OP2) of the projector optical system of each embodiment, a surface marked with ri (i=1, 2, 3, . . ) is the ith surface counted from the integrator (3) side.

<First Embodiment (FIG. 1)>

The projector optical system of the first embodiment has an illumination optical system for illuminating reflection-type display panels (PR, PG, and PB) and a projection optical system (OP1) for projecting the images displayed on those reflection-type display panels (PR, PG, and PB) onto a screen (S). The projection optical system (OP1) is composed of, from the screen (S) side, a front lens unit (GrF), an aperture stop (A), and a rear lens unit (GrR); in addition, in the projection optical system (OP1), a reflection mirror (M) serving as a light-deriving means for directing illumination light toward the reflection-type display panels (PR, PG, and PB) is disposed between the front lens unit (GrF), on one side, and the aperture stop (A) with the rear lens unit (GrR), on the other. This reflection mirror (M) is disposed in the vicinity of the aperture stop (A) so as to cover about a half of the aperture diameter. The illumination optical system is composed of an integrator of a lens-array type (3) having a first and a second lens array (3a and 3b) therein, and an illumination relay optical system (OP2) having five lens elements and a single reflection mirror therein. The integrator (3) forms a plurality of light source images. The illumination relay optical system (OP2) forms, through the reflection mirror (M), images conjugate with the light source images within the projection optical system (OP1).

The light beam emitted from a light source (1) is formed into a substantially parallel light beam by a reflector (2) and is then formed into a light source image on the second lens array (3b) of the integrator (3). To achieve effective use of the light source (1), the integrator (3) has a polarized-light conversion optical system (3c) disposed between the first and second lens arrays (3a and 3b) thereof (for details, refer to Japanese Laid-open Patent Application H9-146064). This light source image is re-focused in the vicinity of the reflection mirror (M) by the illumination relay optical system (OP2). The light beam reflected from the reflection mirror (M) passes through the aperture stop (A) and immediately enters the projection optical system (OP1). Thereafter, the light beam passes through the rear lens unit (GrR) and is then directed to a color separating/integrating prism (Pr1) so as to be subjected color separation (i.e. white illumination light is separated into red, green, and blue light components). As a result, the display surface of each of the three reflection-type display panels (PR, PG, and PB) is illuminated with light of a different one of those three colors. At this time, the color separating/integrating prism (Pr1) lets the green light component pass straight along the optical axis and simultaneously reflects the red and blue light components in opposite directions, with the result that, the red, green, and blue light components are reflected by the display panels for red-light, green-light, and blue-light (PR, PG, and PB), respectively.

On reaching the reflection-type display panels (PR, PG, and PB), the illumination light is reflected in accordance with the patterns of the pixels formed by the individual display panels. In a case where reflection-type liquid crystal panels are employed as the reflection-type display panels (PR, PG, and PB), the liquid crystal panels are each fitted with a polarized-light filter immediately in front of them so as to act as LCD (Liquid crystal display) panels that reflect only a light component whose polarizing surface is not changed by liquid crystal. The light beams reflected from the display panels (PR, PG, and PB) are directed to the color separating/integrating prism (Pr1) so as to be integrated into a single projection light beam. The projection light beam thus obtained first passes through the rear lens unit (GrR), and then, at the position of the aperture stop (A) where the reflection mirror (M) is disposed, passes through the other half of the aperture stop (A) that is not covered by the reflection mirror (M). Thus, the projection light beam that has passed through the aperture stop (A) without striking the reflection mirror (M) forms, through the front lens unit (GrF) having a negative optical power, a display image on the screen (S).

Figure 7:
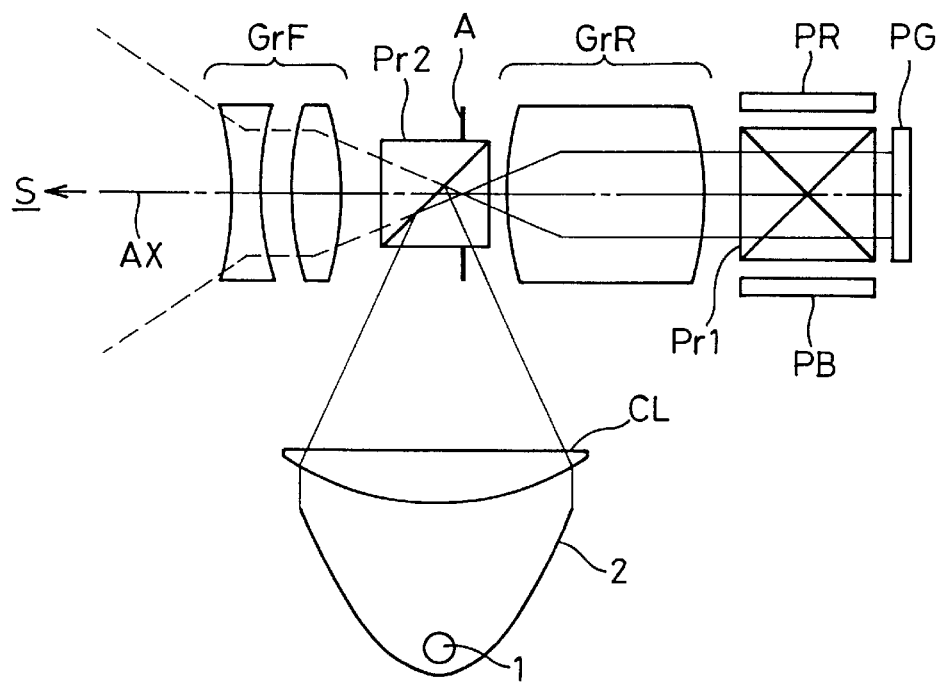
FIG. 7 is an optical arrangement diagram of a conventional example of a projector optical system.

In a case where, as in this embodiment, the reflection mirror (M) is disposed on the screen (S) side of the aperture stop (A), it is preferable that the reflection mirror (M) be kept inclined at an angle of less than 45° with respect to the optical axis (AX) so that the illumination light is reflected with an obtuse angle. Such arrangement of the reflection mirror (M) makes it possible to prevent the illumination light from being eclipsed by the aperture stop (A) or the rear lens unit (GrR), and thus achieve uniform illumination over the display surfaces of the individual display panels (PR, PG, and PB). Note that, in the previously-described conventional example (shown in FIG. 7), a polarized-light separating prism (Pr2) is employed as a light-deriving means. However, if a polarized-light separating prism (Pr2) is employed in a projector optical system that has, like that of this embodiment, a front lens unit (GrF) having a strong negative optical power, it is impossible to achieve satisfactory separation of polarized light. Accordingly, in this case, it is preferable that a reflecting mirror (M) be employed as a light-deriving means.

The projection optical system (OP1) is designed to be telecentric toward the reduction side (i.e. toward the display panels (PR, PG, and PB)). In this embodiment, in which illumination light is derived from the vicinity of the aperture stop (A), it is essential to make the projection optical system (OP1) telecentric in order to eliminate uneven illumination of the display panels (PR, PG, and PB) and to allow the light beams reflected from the display panels (PR, PG, and PB) to pass properly through the aperture stop (A) without striking the mirror (M) disposed in the vicinity thereof. To allow the projection optical system (OP1) to be telecentric and nevertheless offer a wide angle of view, and simultaneously make both the front lens unit (GrF) and the illumination relay optical system (OP2) sufficiently compact, it is preferable that Condition (I) below be fulfilled.

$$-1.5 < \phi F/\phi < -0.1 \tag{I}$$

where $\phi F$ represents the optical power of the front lens unit (GrF) of the projection optical system (OP1) (i.e. the total optical power available on the screen (S) side of the position from which illumination light is derived); and $\phi$ represents the optical power of the entire projection optical system (OP1).

If the upper limit of Condition (I) is exceeded, the lens element provided at the screen (S)-side end of the front lens unit (GrF) needs to be twice as large as each of the reflection-type display panels (PR, PG, and PB), and thus the illumination relay optical system (OP2) also needs to be made accordingly large. If the lower limit of Condition (I) is exceeded, both the distance between the front lens unit (GrF) and the aperture stop (A) and that between the rear lens unit (GrR) and the aperture stop (A) need to be made shorter. This makes it impossible to dispose a light-deriving means such as the reflection mirror (M). Furthermore, in particular, to obtain satisfactory optical performance in a sufficiently compact optical arrangement, it is preferable that Condition (I') below be fulfilled.

$$-1.3 < \phi F/\phi < -0.35 \tag{I'}$$

Moreover, to obtain satisfactory optical performance in the projection optical system (OP1), it is preferable that its front lens unit (GrF) be composed of two or more negative lens elements including at least one negative meniscus lens element having a convex surface as its screen (S)-side surface. It is preferable that, in addition thereto, the focal length, the F number, and the aperture diameter of the entire projection optical system (OP1) fulfill Condition (II) below.

$$0.2 < FL/(FNO \times D) < 0.8 \tag{II}$$

where

FL represents the focal length of the entire projection optical system (OP1);

FNO represents the F number; and

D represents the aperture diameter (i.e. the diameter of the aperture stop (A))

If the upper limit of Condition (II) is exceeded, it is impossible to keep the projection optical system (OP1) telecentric and simultaneously secure a sufficiently long back focal length. This makes it impossible to dispose the color separating/integrating prism (Pr1). If the lower limit of Condition (II) is exceeded, the rear lens unit (GrR) needs to have an unduly long total length, and the front lens unit (GrF) needs to have an unduly strong optical power. Accordingly, to secure satisfactory optical performance, four or more lens elements are required in the front lens unit (GrF).

<Second Embodiment (FIG. 3)>

In contrast to the projector optical system of the first embodiment, in which the illumination light beam is bent by the reflection mirror (M) disposed in the vicinity of the aperture stop (A), that of a second embodiment is so designed that the projection light beam is bent by the reflection mirror (M) disposed in the vicinity of the aperture stop (A). This arrangement, in which the optical path of the front lens unit (GrF) of the projection optical system (OP1) is bent, allows easy arrangement of the illumination optical system. In a case where, as in this embodiment, the projector optical system is so designed that the projection light beam takes an optical path bent by the reflection mirror (M) disposed on the screen (S) side of the aperture stop (A), by reflecting the projection light beam with an obtuse angle, it is possible to place the aperture stop (A) in an appropriate position with respect to the projection light beam and thus effectively prevent excessive flare and uneven distribution of light.

\<Third Embodiment (FIG. 5)\>

In contrast to the projector optical systems of the first and second embodiments, in which the reflection mirror (M) serving as a light-deriving means is disposed on the screen (S) side of the aperture stop (A), that of a third embodiment is so designed that the reflection mirror (M) is disposed on the display panel (PR, PG, and PB) side of the aperture stop (A). This arrangement, in which the illumination light beam takes a path bent by the reflection mirror (M) disposed on the display panel (PR, PG, and PB) side of the aperture stop (A), by reflecting the illumination light beam with an acute angle, it is possible to place the aperture stop (A) in an appropriate position with respect to the projection light beam and thus effectively prevent excessive flare and uneven distribution of light.

EXAMPLES

Hereinafter, examples of the projector optical systems embodying the present invention will be presented with reference to their construction data, graphic representations of aberrations, and other data. Table 1 lists the construction data of the projection optical system (OP1) of Example 1, Table 2 lists the construction data of the illumination relay optical system (OP2) of Example 1, Table 3 lists the construction data of the projection optical system (OP1) of Example 2, Table 4 lists the construction data of the illumination relay optical system (OP2) of Example 2, Table 5 lists the construction data of the projection optical system (OP1) of Example 3, and Table 6 lists the construction data of the illumination relay optical system (OP2) of Example 3. These Examples 1 to 3 respectively correspond to the first, second, and third embodiments described above and have optical compositions as shown in FIGS. 1, 3, and 5.

In the construction data of the projection optical system (OP1) of the examples, ri (i=1, 2, 3, . . . ) represents the radius of curvature of the ith surface counted from the enlargement side (i.e. the screen (S) side), and di (i=1, 2, 3, . . . ) represents the ith axial distance counted from the enlargement side (dS represents the distance between the screen (S) and the screen (S)-side end surface of the projection optical system (OP1), dA represents the distance between the aperture stop (A) and the aperture (A)-side end surface of the rear lens unit (GrR)). Ni (i=1, 2, 3, . . . ) and vi (i=1, 2, 3, . . . ) represent the refractive index (Nd) and the Abbe number (vd), respectively, for d-line of the ith optical element counted from the enlargement side. Also listed are the maximum image height Ymax, the F-numbers FNO, the values corresponding to the relevant conditions, and other data.

In addition, in the construction data of the illumination relay optical system (OP2), ri (i=1, 2, 3, . . . ) represents the radius of curvature of the ith surface counted from the integrator (3) side, and di (i=1, 2, 3, . . . ) represents the ith axial distance counted from the integrator (3) side (dI represents the distance between the second lens array (3b) of the integrator (3) and the surface (r1) of the illumination relay optical system (OP2) that is closest to the second lens array (3b)). Ni (i=1, 2, 3, . . . ) and vi (i=1, 2, 3, . . . ) represent the refractive index (Nd) and the Abbe number (vd), respectively, for d-line of the ith optical element counted from the integrator (3) side.

Furthermore, a surface whose radius of curvature ri is marked with an asterisk (*) is an aspherical surface, whose surface shape is defined by Formula (AS) below. Also listed together with the construction data are the aspherical coefficients of each aspherical surface and other data.

$$X = (C \cdot Y^2) / \left(1 + \sqrt{1 - \varepsilon \cdot C^2 \cdot Y^2}\right) + \sum (Ai \cdot Y^i) \quad \text{(AS)}$$

where

X represents the displacement from the reference surface in the optical axis (AX) direction;

Y represents the height in a direction perpendicular to the optical axis (AX);

C represents the paraxial curvature;

$\varepsilon$ represents the quadric surface parameter; and

Ai represents the aspherical coefficient of the ith order.

Figure 2:
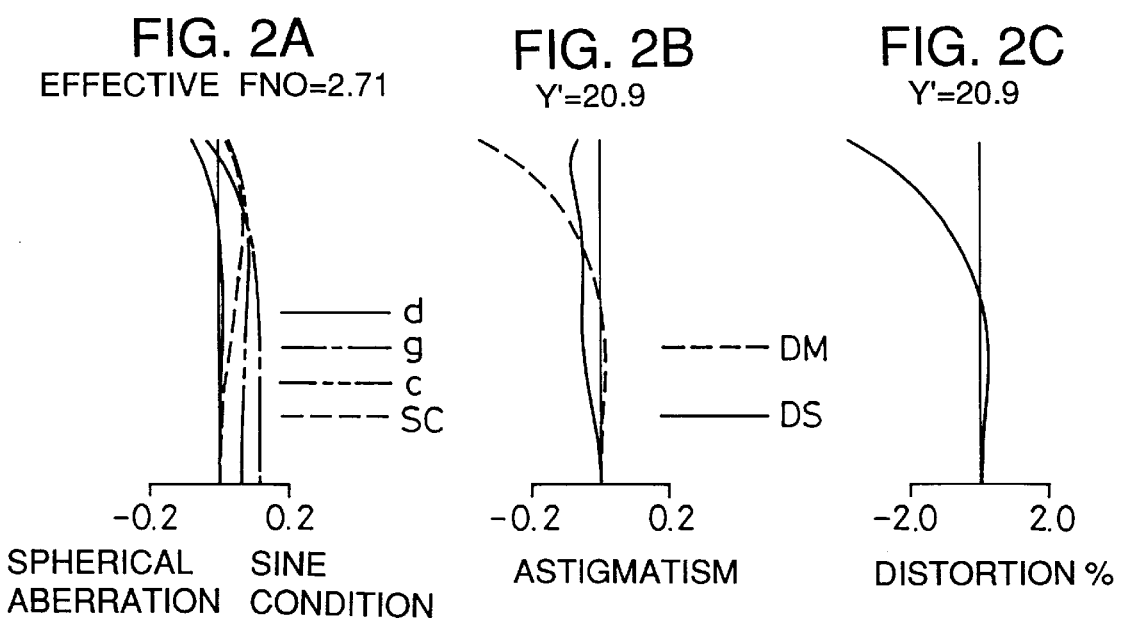
FIGS. 2A to 2C are graphic representations of the aberrations observed in the projection optical system of Example 1.
Figure 6A:
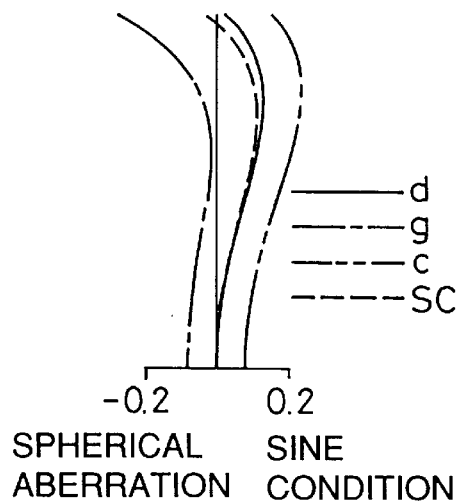
FIGS. 6A to 6C are graphic representations of the aberrations observed in the projection optical system of Example 3.
Figure 6B:
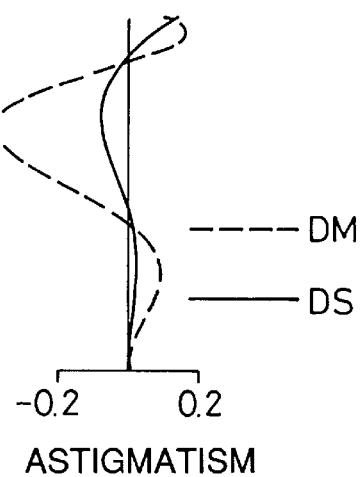
Figure 6C:
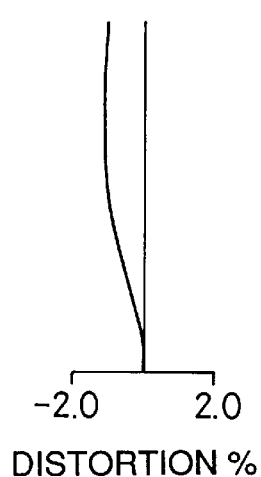

FIGS. 2A to 2C are graphic representations of the aberrations observed at the reduction side in the projection optical system (OP1) of Example 1. FIGS. 4A to 4C are graphic representations of the aberrations observed at the reduction side in the projection optical system (OP1) of Example 2. FIGS. 6A to 6C are graphic representations of the aberrations observed at the reduction side in the projection optical system (OP1) of Example 3. Of all the above diagrams, FIGS. 2A, 4A, and 6A show spherical aberration and sine condition; FIGS. 2B, 4B, and 6B show astigmatism; and FIGS. 2C, 4C, and 6C show distortion (Y': image height). In the spherical aberration diagrams, the solid line (d) represents the aberration for d-line, the dash-and-dot line (g) represents the aberration for g-line, the dash-dot-dot line (c) represents the aberration for c-line, and the broken line (SC) represents the sine condition. In the astigmatism diagrams, the broken line (DM) and the solid line (DS) represent the astigmatism for d-line on the meridional plane and on the sagittal plane, respectively. In the distortion diagrams, the solid line represents the distortion % for d-line. Note that, in practical use, the projection optical system has the image plane on the screen (S) and has the object plane on the surfaces of the display panels of reflection type (PR, PG, PB). However, in the above examples, the projection optical system is regarded as a reduction system having the object plane on the screen (S), and its optical performance is evaluated on the reflection- type display panels (PR, PG, PB).

As described heretofore, according to the present invention, the front lens unit of the projection optical system is given a strong negative optical power. This makes it possible to employ a high-efficiency light source and simultaneously achieve a wide angle of view in the projection optical system, without sacrificing the compactness of the projection optical system and the illumination optical system. For example, even if a wide angle of view is achieved in the projection optical system, the front lens unit provided therein does not need to be made larger, and even if a high-efficiency light source and an integrator are employed in the projector optical system, the illumination relay optical system can be kept compact and simple.

TABLE 1

<<Construction Data of Projection Optical System (OP1) of Example 1>>

Ymax = 20.9
FNO = 2.7
Conditions (I) and (I'): $\phi F/\phi$ = −1.032
Condition (II): FL/(FNO × D) = 0.436

| Radius of Curvature | Axial Distance | Refractive Index | Abbe Number |
|---|---|---|---|

TABLE 1-continued

<<Construction Data of Projection Optical System (OP1) of Example 1>>

{Screen (S)} dS = 845.00

<Front Lens Unit (GrF)> r1 = 30.0087
  d1 = 3.32    N1 = 1.49300    ν1 = 58.34
r2* = 21.0644
  d2 = 13.69
r3 = −161.7495
  d3 = 2.00    N2 = 1.83408    ν2 = 41.42
r4 = 34.7412
  d4 = 32.30 {Reflection Mirror (M)}

{Aperture Stop (A)} dA = 4.00

<Rear Lens Unit (GrR)> r5 = 99.8363
  d5 = 7.42    N3 = 1.75275    ν3 = 32.43
r6 = −98.1740
  d6 = 34.82
r7 = 60.0730
  d7 = 20.00   N4 = 1.51996    ν4 = 66.17
r8 = −46.7347
  d8 = 1.47
r9 = −44.1400
  d9 = 8.00    N5 = 1.84349    ν5 = 23.74
r10 = 169.1924
  d10 = 1.03
r11 = 79.6914
  d11 = 10.00  N6 = 1.52661    ν6 = 58.17
r12 = −104.8306
  d12 = 14.34
r13* = 214.0223
  d13 = 13.10  N7 = 1.49300    ν7 = 58.34
r14 = −60.5367
  d14 = 11.30

<Color Separating/Integrating Prism (Pr1)> r15 = ∞
  d15 = 41.23  N8 = 1.51680    ν8 = 64.20
r16 = ∞
  d16 = 6.00

{Reflection-type Display Panels (PR, PG, and PB)}

[Aspherical Coefficients of 2nd Surface (r2)]

ε = 0.9188
A4 = −5.62196 × $10^{-6}$
A6 =   1.09438 × $10^{-8}$
A8 = −1.32364 × $10^{-10}$
A10 =  2.89984 × $10^{-13}$
A12 = −6.73542 × $10^{-17}$
A14 = −8.25210 × $10^{-19}$

[Aspherical Coefficients of 13th Surface (r13)]

ε = 1.0000
A4 = −5.43102 × $10^{-6}$
A6 =   2.21700 × $10^{-10}$
A8 = −5.54474 × $10^{-13}$
A10 = −1.24165 × $10^{-16}$
A12 =  2.82502 × $10^{-19}$
A14 =  7.35801 × $10^{-23}$

TABLE 2

<<Construction Data of Illumination Relay Optical System (OP2) of Example 1>>

| Radius of Curvature | Axial Distance | Refractive Index | Abbe Number |
|---|---|---|---|

{Second Lens Array (3b) . . . Light Source Image formed by Integrator} dI = 7.89
r1 = ∞
  d1 = 10.00   N1 = 1.51680    ν1 = 64.20
r2 = −121.7801
  d2 = 150.00
r3 = 97.9451
  d3 = 9.29    N2 = 1.71300    ν2 = 53.93
r4 = −2177.8901
  d4 = 27.75
r5 = 37.1586
  d5 = 3.20    N3 = 1.61293    ν3 = 36.96
r6 = 27.4269
  d6 = 9.45
r7 = 60.2878
  d7 = 10.00   N4 = 1.80518    ν4 = 25.43
r8 = 230.7167
  d8 = 6.65
r9 = 41.5660
  d9 = 11.33   N5 = 1.80518    ν5 = 25.43
r10 = 589.9775
  d10 = 32.50

{Aperture Stop (A) of Projection Optical System (OP1)}

TABLE 3

<<Construction Data of Projection Optical System (OP1) of Example 2>>

Ymax = 20.9
FNO = 2.7
Conditions (I) and (I'): φF/φ = −1.224
Condition (II): FL/(FNO × D) = 0.403

| Radius of Curvature | Axial Distance | Refractive Index | Abbe Number |
|---|---|---|---|

{Screen (S)} dS = 845.00

<Front Lens Unit (GrF)> r1 = 28.5310
  d1 = 5.00    N1 = 1.49300    ν1 = 58.34
r2* = 22.3378
  d2 = 18.65
r3 = −92.2092
  d3 = 2.00    N2 = 1.85000    ν2 = 40.04
r4 = 28.2673
  d4 = 32.25 {Reflection Mirror (M)}

{Aperture Stop (A)} dA = 4.00

<Rear Lens Unit (GrR)> r5 = 101.4209
  d5 = 7.42    N3 = 1.78413    ν3 = 34.93
r6 = −78.8575
  d6 = 33.19
r7 = 58.2656
  d7 = 17.79   N4 = 1.48750    ν4 = 70.44
r8 = −46.7277
  d8 = 1.41
r9 = −42.3044
  d9 = 2.00    N5 = 1.84699    ν5 = 25.00
r10 = 139.4807
  d10 = 0.01
r11 = 86.9467
  d11 = 8.31   N6 = 1.48750    ν6 = 70.44

TABLE 3-continued

<<Construction Data of Projection Optical System (OP1) of Example 2>> r12 = −88.0848
　　　　　　　d12 = 25.85
r13* = 75.8363
　　　　　　　d13 = 14.56　　N7 = 1.49300　　ν7 = 58.34
r14 = −88.1819
　　　　　　　d14 = 10.35
<Color Separating/Integrating Prism (Pr1)> r15 = ∞
　　　　　　　d15 = 41.23　　N8 = 1.51680　　ν8 = 64.20
r16 = ∞
　　　　　　　d16 = 6.00

{Reflection-type Display Panels (PR, PG, and PB)}

[Aspherical Coefficients of 2nd Surface (r2)]

$\epsilon = 0.8827$
 $A4 = -8.62873 \times 10^{-6}$
 $A6 = 3.19882 \times 10^{-8}$
 $A8 = -1.67085 \times 10^{-10}$
 $A10 = 2.48803 \times 10^{-13}$
 $A12 = -6.12963 \times 10^{-18}$
 $A14 = -4.44236 \times 10^{-19}$

[Aspherical Coefficients of 13th Surface (r13)]

$\epsilon = 1.0000$
 $A4 = -4.38734 \times 10^{-6}$
 $A6 = 1.05685 \times 10^{-9}$
 $A8 = -8.03644 \times 10^{-13}$
 $A10 = -7.75876 \times 10^{-16}$
 $A12 = 7.21641 \times 10^{-20}$
 $A14 = 1.05743 \times 10^{-21}$

TABLE 4

<<Construction Data of Illumination Relay Optical System (OP2) of Example 2>>

| Radius of Curvature | Axial Distance | Refractive Index | Abbe Number |
|---|---|---|---|

{Second Lens Array (3b) . . . Light Source Image formed by Integrator} dI = 8.00
r1 = ∞
　　　　　　　d1 = 12.38　　N1 = 1.51680　　ν1 = 64.20
r2 = −119.5912
　　　　　　　d2 = 150.18
r3 = 85.9609
　　　　　　　d3 = 10.16　　N2 = 1.71300　　ν2 = 53.93
r4 = 5730.3306
　　　　　　　d4 = 19.80
r5 = 38.1844
　　　　　　　d5 = 6.78　　N3 = 1.61293　　ν3 = 36.96
r6 = 27.3687
　　　　　　　d6 = 10.56
r7 = 65.3830
　　　　　　　d7 = 10.00　　N4 = 1.80518　　ν4 = 25.43
r8 = 191.6355
　　　　　　　d8 = 3.61
r9 = 40.0556
　　　　　　　d9 = 14.51　　N5 = 1.80518　　ν5 = 25.43
r10 = 272.4766
　　　　　　　d10 = 32.50
{Aperture Stop (A) of Projection Optical System (OP1)}

TABLE 5

<<Construction Data of Projection Optical System (OP1) of Example 3>>

Ymax = 20.9
FNO = 2.5
Conditions (I) and (I'): $\phi F/\phi = -0.384$
Condition (II): FL/(FNO × D) = 0.463

| Radius of Curvature | Axial Distance | Refractive Index | Abbe Number |
|---|---|---|---|

{Screen (S)} dS = 845.00
<Front Lens Unit (GrF)> r1 = 51.0762
　　　　　　　d1 = 5.89　　N1 = 1.75450　　ν1 = 51.57
r2* = 27.7720
　　　　　　　d2 = 10.26
r3 = 56.2870
　　　　　　　d3 = 2.20　　N2 = 1.75450　　ν2 = 51.57
r4 = 23.4777
　　　　　　　d4 = 28.17
r5 = 55.2196
　　　　　　　d5 = 4.49　　N3 = 1.74799　　ν3 = 24.35
r6 = 159.0913
　　　　　　　d6 = 10.94
{Aperture Stop (A)} dA = 30.00 {Reflection Mirror (M)}
<Rear Lens Unit (GrR)> r7 = 75.1512
　　　　　　　d7 = 12.83　　N4 = 1.75486　　ν4 = 51.51
r8 = −63.7170
　　　　　　　d8 = 8.32
r9 = −42.6588
　　　　　　　d9 = 2.20　　N5 = 1.80851　　ν5 = 23.04
r10 = 281.4816
　　　　　　　d10 = 0.10
r11 = 128.9753
　　　　　　　d11 = 10.40　　N6 = 1.48749　　ν6 = 70.44
r12 = −70.8150
　　　　　　　d12 = 15.58
r13* = 47.7779
　　　　　　　d13 = 9.59　　N7 = 1.49300　　ν7 = 58.34
r14 = −1120.8501
　　　　　　　d14 = 1.17
<Color Separating/Integrating Prism (Pr1)> r15 = ∞
　　　　　　　d15 = 41.23　　N8 = 1.51680　　ν8 = 64.20
r16 = ∞
　　　　　　　d16 = 16.60

{Reflection-type Display Panels (PR, PG, and PB)}

[Aspherical Coefficients of 2nd Surface (r2)]

$\epsilon = 1.0000$
 $A4 = -2.77475 \times 10^{-5}$
 $A6 = -1.25468 \times 10^{-8}$
 $A8 = 9.31525 \times 10^{-12}$
 $A10 = 2.79299 \times 10^{-15}$
 $A12 = -2.80032 \times 10^{-17}$

[Aspherical Coefficients of 13th Surface (r13)]

$\epsilon = 1.0000$
 $A4 = -3.07903 \times 10^{-6}$
 $A6 = -5.12639 \times 10^{-10}$
 $A8 = -3.36445 \times 10^{-14}$

TABLE 6

<<Construction Data of Illumination Relay
Optical System (OP2) of Example 3>>

| Radius of Curvature | Axial Distance | Refractive Index | Abbe Number |
|---|---|---|---|
| {Second Lens Array (3b) . . . Light Source Image formed by Integrator} | | | |
|  | dI = 8.00 | | |
| r1 = ∞ | | | |
|  | d1 = 9.73 | N1 = 1.51680 | ν1 = 64.20 |
| r2 = −184.6971 | | | |
|  | d2 = 191.28 | | |
| r3 = 74.4435 | | | |
|  | d3 = 17.64 | N2 = 1.71300 | ν2 = 53.93 |
| r4 = −2173.2044 | | | |
|  | d4 = 3.00 | | |
| r5 = 33.3489 | | | |
|  | d5 = 2.00 | N3 = 1.61293 | ν3 = 36.96 |
| r6 = 27.1953 | | | |
|  | d6 = 68.22 | | |
| r7 = 790.1953 | | | |
|  | d7 = 10.00 | N4 = 1.80518 | ν4 = 25.43 |
| r8 = −141.9485 | | | |
|  | d8 = 18.14 | | |
| r9 = 47.3658 | | | |
|  | d9 = 10.11 | N5 = 1.80518 | ν5 = 25.43 |
| r10 = 384.3936 | | | |
|  | d10 = 32.50 | | |
| {Aperture Stop (A) of Projection Optical System (OP1)} | | | |

What is claimed is:

1. A projector optical system comprising:

a reflection-type display panel;

an illumination optical system for illuminating the reflection-type display panel;

a projection optical system for projecting images displayed on the reflection-type display panel onto a projected surface, the projection optical system being composed of, from the projected surface side, a front lens unit and a rear lens unit; and a light-deriving means for directing illumination light toward the reflection-type display panel, the light-deriving means being disposed between the front lens unit and the rear lens unit, wherein the following condition is fulfilled:

$$-1.5 < \phi F/\phi < -0.1$$

where $\phi F$ represents an optical power of the front lens unit of the projection optical system; and $\phi$ represents an optical power of the entire projection optical system.

2. A projector optical system as claimed in claim 1, wherein the illumination optical system has an integrator for forming a plurality of light source images, and further has an illumination relay optical system for forming, through the light-deriving means, images conjugate with the light source images within the projection optical system.

3. A projector optical system as claimed in claim 1, further comprising:

an aperture stop provided between the front and rear lens units, wherein the light-deriving means has a reflection surface which is disposed near the aperture stop so as to cover about a half of an aperture diameter.

4. A projector optical system as claimed in claim 1, wherein the front lens unit is composed of two or more negative lens elements including at least one negative meniscus lens element having a convex surface on its projected surface side.

5. A projector optical system as claimed in claim 1, wherein the projection optical system has an aperture stop between the front and rear lens units, and wherein the following condition is fulfilled:

$$0.2 < FL/(FNO \times D) < 0.8$$

where

FL represents a focal length of the entire projection optical system;

FNO represents an F number; and

D represents an aperture diameter.

6. A projector optical system as claimed in claim 1, wherein the projector optical system has at least one aspherical surface.

7. A projector optical system as claimed in claim 1, wherein an optical axis of the front lens unit is parallel to an optical axis of the rear lens unit.

8. A projector optical system as claimed in claim 1, wherein an optical axis of the illumination optical system is parallel to an optical axis of the rear lens unit.

9. A projector optical system for projecting images, displayed on a reflection-type display panel, onto a projected surface, comprising, from the projected-surface side:

a front lens unit;

a light-deriving means for directing illumination light supplied from an external light source toward the reflection-type display panel; and a rear lens unit;

wherein the following condition is fulfilled:

$$-1.5 < \phi F/\phi < -0.1$$

where $\phi F$ represents an optical power of the front lens unit of the projector optical system; and $\phi$ represents an optical power of the entire projector optical system.

10. A projector optical system as claimed in claim 9, further comprising:

an aperture stop provided between the front and rear lens units, wherein the light-deriving means has a reflection surface which is disposed near the aperture stop so as to cover about a half of an aperture diameter.

11. A projector optical system as claimed in claim 9, wherein the front lens unit is composed of two or more negative lens elements including at least one negative meniscus lens element having a convex surface on its projected surface side.

12. A projector optical system as claimed in claim 9, wherein the projector optical system has an aperture stop between the front lens unit and the rear lens unit, and wherein the following condition is fulfilled:

$$0.2 < FL/(FNO \times D) < 0.8$$

where

FL represents a focal length of the projector optical system;

FNO represents an F number; and

D represents an aperture diameter.

13. A projector optical system as claimed in claim 9, further comprising:

an aperture stop provided between the front lens unit and the rear lens unit, wherein the light-deriving means has a reflection surface which is disposed near the aperture stop so as to cover about a half of an aperture diameter.

14. A projector optical system as claimed in claim 9, further comprising:

an aperture stop provided between the front lens unit and the rear lens unit, wherein the light-deriving means has a reflection surface which is disposed near the aperture stop so as to cover about a half of an aperture diameter, wherein the light-deriving means is provided on the projected surface side of the aperture stop.

15. A projector optical system comprising:

three reflection-type display panels corresponding to three primary color images;

a color separating/integrating prism;

an illumination optical system for illuminating the reflection-type display panels via the color separating/integrating prism;

a projection optical system for projecting images displayed on the reflection-type display panels, through the color separating/integrating prism, onto a projected surface, the projection optical system being composed of, from the projected surface side, a front lens unit and a rear lens unit; and a light-deriving means for directing illumination light toward the reflection-type display panels, the light-deriving means being disposed between the front lens unit and the rear lens unit, wherein the following condition is fulfilled:

$$1.5 < \phi F/\phi < -0.1$$

where $\phi F$ represents an optical power of the front lens unit of the projection optical system; and $\phi$ represents an optical power of the entire projection optical system.

16. A projector optical system as claimed in claim 15, wherein the illumination optical system has an integrator for forming a plurality of light source images, and further has an illumination relay optical system for forming, through the light-deriving means, images conjugate with the light source images within the projection optical system.

17. A projector optical system as claimed in claim 15, further comprising:

an aperture stop provided between the front and rear lens units, wherein the light-deriving means has a reflection surface which is disposed near the aperture stop so as to cover about a half of an aperture diameter.

18. A projector optical system as claimed in claim 15, wherein the front lens unit is composed of two or more negative lens elements including at least one negative meniscus lens element having a convex surface on its projected surface side.

19. A projector optical system as claimed in claim 15, wherein the projection optical system has an aperture stop between the front and rear lens units, and wherein the following condition is fulfilled:

$$0.2 < FL/(FNO \times D) < 0.8$$

where

FL represents a focal length of the entire projection optical system;

FNO represents an F number; and

D represents an aperture diameter.

20. A projector optical system as claimed in claim 15, wherein the projector optical system has at least one aspherical surface.

21. A projector optical system as claimed in claim 15, wherein an optical axis of the front lens unit is parallel to an optical axis of the rear lens unit.

22. A projector optical system as claimed in claim 15, wherein an optical axis of the illumination optical system is parallel to an optical axis of the rear lens unit.

* * * * *

UNITED STATES PATENT AND TRADEMARK OFFICE
CERTIFICATE OF CORRECTION

PATENT NO.     : 6,091,550
DATED          : July 18, 2000
INVENTOR(S)    : Kohtaro Hayashi et al.

Page 1 of 1

It is certified that error appears in the above-identified patent and that said Letters Patent is hereby corrected as shown below:

Title page,
[75] Inventors: first line, after Hayashi,", delete "Toyonaka",
and insert -- Toyonaka - Shi --.
[75] Inventors: second line, after Sawai," delete "Yamatotakada",
and insert -- Yamatotakada-Shi --.
[75] Inventors: third line, after "Takimoto,", delete "Nishinomiya", and insert
-- Nishinomiya-Shi --.
[75] Inventors: fourth line after "Konno," delete "Sakai", and insert - Sakai-- Shi --.

Column 4,
Line 62, after "subjected", insert -- to -- .

Column 13,
line 35, after "images", insert -- , -- .
Line 36, after "panel", insert -- , -- .

Column 14,
Line 30, delete "projected-surface", and insert -- projected surface -- .
Line 44, delete "entire".

Column 15,
Line 28, after "images", insert -- , -- .
Line 40, delete "$1.5<\Phi F/\Phi<-0.1$", and insert -- $-1.5<\Phi F/\Phi<-0.1$ -- .

Signed and Sealed this

Eleventh Day of September, 2001

Attest:

NICHOLAS P. GODICI
*Attesting Officer*   *Acting Director of the United States Patent and Trademark Office*